(12) United States Patent
Zhang et al.

(10) Patent No.: US 8,325,433 B2
(45) Date of Patent: Dec. 4, 2012

(54) SYSTEMS AND METHODS FOR REDUCED FORMAT DATA PROCESSING

(75) Inventors: Xun Zhang, Westford, MA (US);
Jeffrey Grundvig, Loveland, CO (US);
Viswanath Annampedu, Schnecksville, PA (US)

(73) Assignee: LSI Corporation, Milpitas, CA (US)

( * ) Notice: Subject to any disclaimer, the term of this patent is extended or adjusted under 35 U.S.C. 154(b) by 151 days.

(21) Appl. No.: 13/009,067

(22) Filed: Jan. 19, 2011

(65) Prior Publication Data
US 2012/0182643 A1 Jul. 19, 2012

(51) Int. Cl.
*G11B 20/10* (2006.01)
(52) U.S. Cl. .................................................. 360/39
(58) Field of Classification Search .............. 360/39, 360/40, 42, 77.02, 77.07; 711/115, 167; 375/336, 360; 318/700, 400.27; 702/60
See application file for complete search history.

(56) References Cited

U.S. PATENT DOCUMENTS

| | | | |
|---|---|---|---|
| 3,973,182 | A | 8/1976 | Kataoka |
| 3,973,183 | A | 8/1976 | Kataoka |
| 4,024,571 | A | 5/1977 | Dischert et al. |
| 4,066,881 | A * | 1/1978 | Houdard .................. 708/405 |
| 4,777,544 | A | 10/1988 | Brown et al. |
| 4,956,804 | A * | 9/1990 | Matsumoto .................. 711/115 |
| 5,130,866 | A | 7/1992 | Klaassen et al. |
| 5,237,325 | A | 8/1993 | Klein et al. |
| 5,278,703 | A | 1/1994 | Rub et al. |
| 5,309,357 | A | 5/1994 | Stark et al. |
| 5,341,249 | A | 8/1994 | Abbott et al. |
| 5,377,058 | A | 12/1994 | Good et al. |
| 5,425,058 | A * | 6/1995 | Mui .................. 375/336 |
| 5,521,948 | A | 5/1996 | Takeuchi |
| 5,523,902 | A | 6/1996 | Pederson |
| 5,594,341 | A | 1/1997 | Majidi-Ahy |
| 5,668,679 | A | 9/1997 | Swearingen et al. |
| 5,696,639 | A | 12/1997 | Spurbeck et al. |

(Continued)

FOREIGN PATENT DOCUMENTS
FR 2904168 A1 1/2008
(Continued)

OTHER PUBLICATIONS

U.S. Appl. No. 12/663,319, filed Dec. 7, 2009, Ratnakar Aravind.

(Continued)

*Primary Examiner* — Fred Tzeng
(74) *Attorney, Agent, or Firm* — Hamilton DeSanctis & Cha

(57) ABSTRACT

Various embodiments of the present invention provide systems and methods for data processing. For example, some embodiments of the present invention provide data processing circuits that include a variable gain amplifier circuit, an analog to digital conversion circuit, a cosine component calculation circuit, a sine calculation circuit, and a zero gain start calculation circuit. The variable gain amplifier circuit is operable to apply a gain to a data input corresponding to a gain feedback value and providing an amplified output. The analog to digital conversion circuit is operable to convert the amplified output to a corresponding series of digital samples. The cosine component calculation circuit is operable to calculate a cosine component from the series of digital samples, and the sine component calculation circuit operable to calculate a sine component from the series of digital samples. The zero gain start calculation circuit is operable to calculate a raw gain error value based on the cosine component and the sine component, where the gain feedback value is derived from the raw gain error value.

25 Claims, 5 Drawing Sheets

U.S. PATENT DOCUMENTS

| | | | |
|---|---|---|---|
| 5,781,129 A | 7/1998 | Schwartz et al. | |
| 5,787,125 A | 7/1998 | Mittel | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,892,632 A | 4/1999 | Behrens | |
| 5,955,783 A | 9/1999 | Ben-Efraim | |
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silverstrin et al. | |
| 6,081,397 A | 6/2000 | Belser | |
| 6,111,712 A | 8/2000 | Vishakhadatta et al. | |
| 6,208,478 B1 | 3/2001 | Chiu et al. | |
| 6,269,058 B1 | 7/2001 | Yamanoi et al. | |
| 6,278,591 B1 | 8/2001 | Chang | |
| 6,338,127 B1* | 1/2002 | Manning | 711/167 |
| 6,400,518 B1 | 6/2002 | Bhaumik et al. | |
| 6,404,829 B1 | 6/2002 | Sonu | |
| 6,411,452 B1 | 6/2002 | Cloke | |
| 6,417,643 B1* | 7/2002 | Shiba et al. | 318/700 |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith | |
| 6,530,060 B1 | 3/2003 | Vis et al. | |
| 6,584,163 B1* | 6/2003 | Myers et al. | 375/360 |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,298,106 B2* | 11/2007 | Yamamoto et al. | 318/400.27 |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,440,208 B1* | 10/2008 | McEwen et al. | 360/39 |
| 7,446,690 B2 | 11/2008 | Kao | |
| 7,499,238 B2 | 3/2009 | Annampedu | |
| 7,525,460 B1 | 4/2009 | Liu et al. | |
| 7,529,320 B2 | 5/2009 | Byrne et al. | |
| 7,558,177 B2 | 7/2009 | Ogura et al. | |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 7,659,837 B2* | 2/2010 | Miyato et al. | 341/50 |
| 7,746,671 B2* | 6/2010 | Radecker et al. | 363/21.03 |
| 7,756,651 B2* | 7/2010 | Holdsclaw | 702/60 |
| 7,859,455 B2* | 12/2010 | Gutt et al. | 342/357.62 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0090971 A1 | 5/2003 | Gushima et al. | |
| 2003/0095350 A1 | 5/2003 | Annampedu et al. | |
| 2004/0179460 A1 | 9/2004 | Furumiya et al. | |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0064847 A1 | 3/2007 | Gaedke | |
| 2007/0071152 A1 | 3/2007 | Chen et al. | |
| 2007/0103805 A1 | 5/2007 | Hayashi | |
| 2007/0104300 A1 | 5/2007 | Esumi et al. | |
| 2007/0183073 A1 | 8/2007 | Sutardja et al. | |
| 2007/0230015 A1 | 10/2007 | Yamashita | |
| 2007/0263311 A1 | 11/2007 | Smith | |
| 2007/0280059 A1 | 12/2007 | Cheng et al. | |
| 2008/0056403 A1 | 3/2008 | Wilson | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park | |
| 2009/0142620 A1 | 6/2009 | Yamamoto et al. | |
| 2009/0245448 A1 | 10/2009 | Ran et al. | |
| 2009/0274247 A1 | 11/2009 | Galbraith et al. | |
| 2010/0128386 A1* | 5/2010 | Keizer et al. | 360/77.07 |

FOREIGN PATENT DOCUMENTS

| | | |
|---|---|---|
| WO | WO 03/047091 | 6/2003 |
| WO | WO 2008/009620 | 1/2008 |

OTHER PUBLICATIONS

U.S. Appl. No. 12/838,601, filed Aug. 19, 2010, Wilson, Ross.
U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/972,904, filed Dec. 20, 2010, Viswanath Annampedu.
U.S. Appl. No. 13/100,021, filed May 3, 2011, Xia, Haitao et al.
U.S. Appl. No. 13/113,210, filed May 23, 2011, Zhang, Xun et al.
U.S. Appl. No. 13/014,754, filed Jan. 27, 2011, Viswanath Annampedu.
U.S. Appl. No. 13/009,067, filed Jan. 19, 2011, Zhang, Xun et al.
U.S. Appl. No. 13/050,048, filed Mar. 17, 2011, Xia, Haitao et al.
U.S. Appl. No. 13/096,873, filed Apr. 28, 2011, Wilson, Ross S.
U.S. Appl. No. 13/173,088, filed Jun. 30, 2011, Grundvig, et al.
U.S. Appl. No. 13/186,267, filed Jul. 19, 2011, Xia, Haitao et al.
U.S. Appl. No. 13/242,983, filed Sep. 23, 2011, Grundvig, Jeffery P.
Annampedu, V. et al, "Adaptive Algorithms for Asynchronous Detection of Coded Servo Signals Based on Interpolation", IEEE Transactions on Magnetics, vol. 41, No. 10, Oct. 2005.

Aziz and Annampedu, "Asynchronous Maximum Likelihood (ML) Detection of Servo repeatable Run Out (RRO) Data" Magnetics Conf. IEEE InternationalMay 2006.

Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.

Kryder, M. et al "Heat Assisted Magnetic Recording" Proc. IEEE, vol. 96, No. 11, p. 1810, Nov. 2008.

Weller et al "Thermal Limits in Ultrahigh-density Magnetic Recording" IEEE Trans. Magn. vol. 35, No. 6, p. 4423, Nov. 1999.

* cited by examiner

SYSTEMS AND METHODS FOR REDUCED FORMAT DATA PROCESSING

BACKGROUND OF THE INVENTION

The present inventions are related to systems and methods for data processing.

A typical storage device includes a magnetic storage medium storing information that is magnetically represented on the storage medium. A head is disposed in relation to the storage medium that senses the magnetically represented information and provides an electrical signal corresponding to the magnetically represented information. This electrical signal is ultimately passed to a data detection circuit that performs one or more data detection processes in order to recover the information originally written to the storage medium. The information maintained on the storage medium typically includes both user data and synchronization data. The user data may be considered a random pattern, while the synchronization data is generally a defined pattern that may be used to synchronize to the phase of the data on the storage medium, and to set an appropriate gain to be applied to data retrieved from the storage medium. Data transfer systems often use a similar approach of transferring data that transfers what may be considered random regions of user data interspersed with synchronization data. Again, the synchronization data is generally a defined pattern that may be used to synchronize to the phase of the data on the storage medium, and to set an appropriate gain to be applied to data retrieved from the storage medium. It is common to utilize phase lock loops to synchronize to the synchronization data. Such an approach is generally effective, but can require a pattern of substantial length to properly process. Such pattern length wastes space on a storage medium and/or reduces transmission bandwidth.

Hence, for at least the aforementioned reasons, there exists a need in the art for advanced systems and methods for data processing.

BRIEF SUMMARY OF THE INVENTION

The present inventions are related to systems and methods for data processing.

Various embodiments of the present invention provide data processing circuits that include a variable gain amplifier circuit, an analog to digital conversion circuit, a cosine component calculation circuit, a sine calculation circuit, and a zero gain start calculation circuit. The variable gain amplifier circuit is operable to apply a gain to a data input corresponding to a gain feedback value and providing an amplified output. The analog to digital conversion circuit is operable to convert the amplified output to a corresponding series of digital samples. The cosine component calculation circuit is operable to calculate a cosine component from the series of digital samples, and the sine component calculation circuit operable to calculate a sine component from the series of digital samples. The zero gain start calculation circuit is operable to calculate a raw gain error value based on the cosine component and the sine component, where the gain feedback value is derived from the raw gain error value.

In some instances of the aforementioned embodiments, the cosine calculation circuit is a first discrete Fourier transform circuit, and the sine calculation circuit is a second discrete Fourier transform circuit. In some cases, the zero gain start calculation circuit calculates an amplitude as the square root of the sine component squared plus the cosine component squared. In some such cases, the circuits further include a selective scaling circuit that selectively scales the amplitude based at least in part on a magnitude of the amplitude to yield the gain feedback value.

In various instances of the aforementioned embodiments, operation of the analog to digital conversion circuit is synchronized to a sampling clock. In such cases, the circuits may further includes a zero phase start circuit operable to calculate a first zero phase start value based upon a first portion of the series of digital samples, and to calculate a second zero phase start value based upon a second portion of the series of digital samples, and a frequency error estimation circuit that calculates a raw frequency error value based at least in part on the first zero phase start value and the second zero phase start value. In such cases, the sampling clock is generated based at least in part an offset derived from the raw frequency error value.

In one or more instances of the aforementioned embodiments, the cosine component is a first cosine component corresponding to a first portion of the series of digital samples, the sine component is a first sine component corresponding to the first portion of the series of digital samples, the cosine component calculation circuit is further operable to calculate a second cosine component corresponding to a second portion of series of digital samples, wherein the sine component calculation circuit is further operable to calculate a second sine component corresponding to the second portion of series of digital samples, and wherein the first zero phase start value ($\theta_1$) is calculated in accordance with the following equation:

$$\theta_1 = a\tan\left(\frac{\text{first cosine component}}{\text{first sine component}}\right).$$

The second zero phase start value ($\theta_2$) is calculated in accordance with the following equation:

$$\theta_2 = a\tan\left(\frac{\text{second cosine component}}{\text{second sine component}}\right).$$

In some such cases, the frequency error estimation circuit calculates the raw frequency error value in accordance with the following equation:

$$\text{raw frequency error value} = \frac{(\theta_2 - \theta_1) * (\text{Sampling Period})/360}{\text{Sample Length}/2},$$

where the Sample Length is the total number of samples used to calculate the first sine component and the second sine component, and the Sampling Length is the period during which a repeating signal conveyed as the series of digital samples repeat.

Other embodiments of the present invention provide methods for data processing that include: receiving an analog signal that includes a repeating signal; converting the analog signal to a series of digital samples synchronous to a sampling clock; performing a discrete Fourier transform of a first portion of the series of digital samples to yield a first sine component and a first cosine component; performing a discrete Fourier transform of a second portion of the series of digital samples to yield a second sine component and a second cosine component; calculating a frequency error value based at least in part on the first sine component, the second sine component, the first cosine component and the second cosine component; and adjusting the sampling clock based at least in part on the frequency error value.

In some cases of the aforementioned embodiments, calculating the frequency error value includes calculating a first zero start value based on the first sine component and the first cosine component, and calculating a second zero start value based on the second sine component and the second cosine component. In some such cases, calculating the first zero start value ($\theta_1$) is done in accordance with the following equation:

$$\theta_1 = a\tan\left(\frac{\text{first cosine component}}{\text{first sine component}}\right).$$

Calculating the second zero phase start value ($\theta_2$) is done in accordance with the following equation:

$$\theta_2 = a\tan\left(\frac{\text{second cosine component}}{\text{second sine component}}\right).$$

In particular cases, calculating the frequency error value is calculated in accordance with the following equation:

$$\text{frequency error value} = \frac{(\theta_2 - \theta_1) * (\text{Sampling Period})/360}{\text{Sample Length}/2},$$

where the Sample Length is the total number of samples used to calculate the first sine component and the second sine component, and the Sampling Length is the period during which a repeating signal is repeated.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3 is a timing diagram showing an example operation of the data processing circuit of FIG. 2a;

DETAILED DESCRIPTION OF THE INVENTION

The present inventions are related to systems and methods for data processing.

Some embodiments of the present invention provide systems and methods for servo or other pattern data processing which offer flexibility in format requirements. For example, in some instances systems and methods disclosed herein may be used to reduce the number of format cycles by half. In one particular case, the format cycles that are reduced are preamble cycles. In such embodiments, zero phase start and zero gain start circuitry is used to provide signals suitable for pattern detection, and zero phase start circuitry is used to generate sampling clocks. In some cases, the signals suitable for pattern detection are SAM and GRAY code data associated with memory storage devices. Such embodiments of the present invention provide phase, frequency and gain information for proper data processing.

Figure 1:
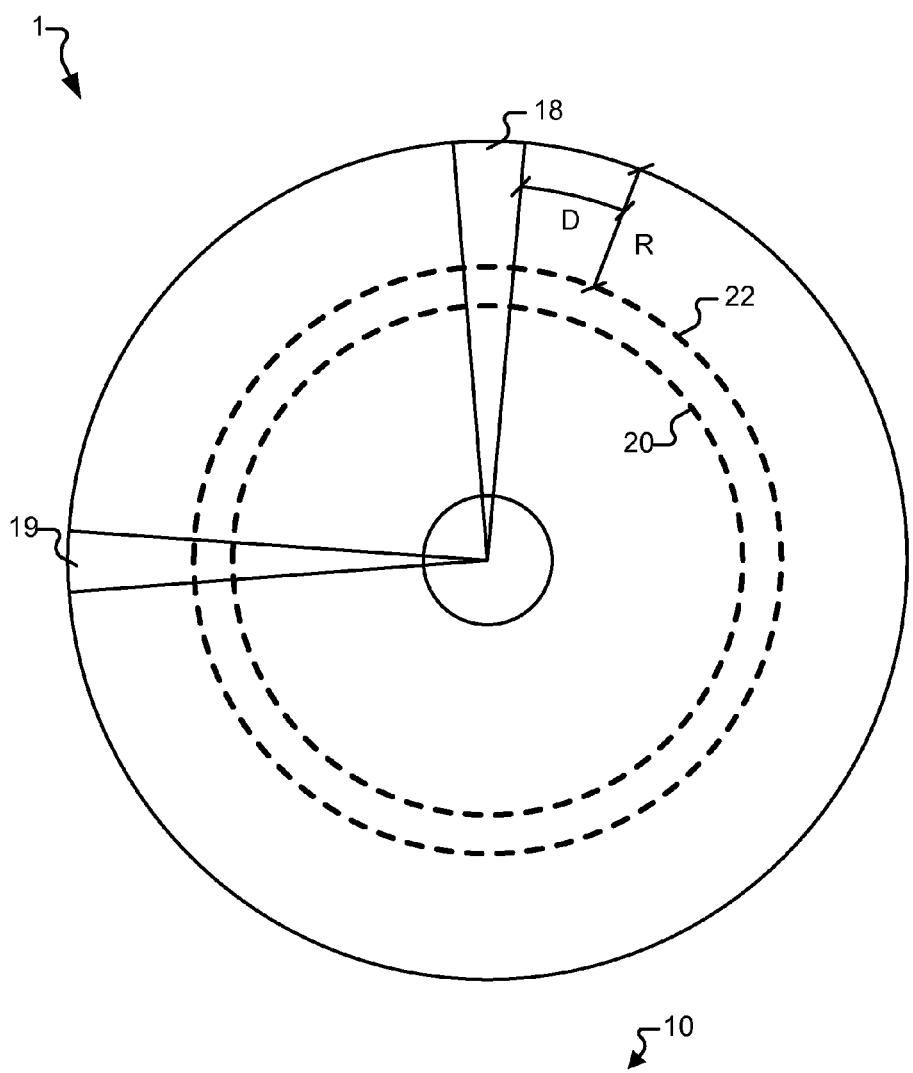
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14. Between the servo data bit patterns 10a and 10b, a user data region 16 is provided.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18.

Figure 2:
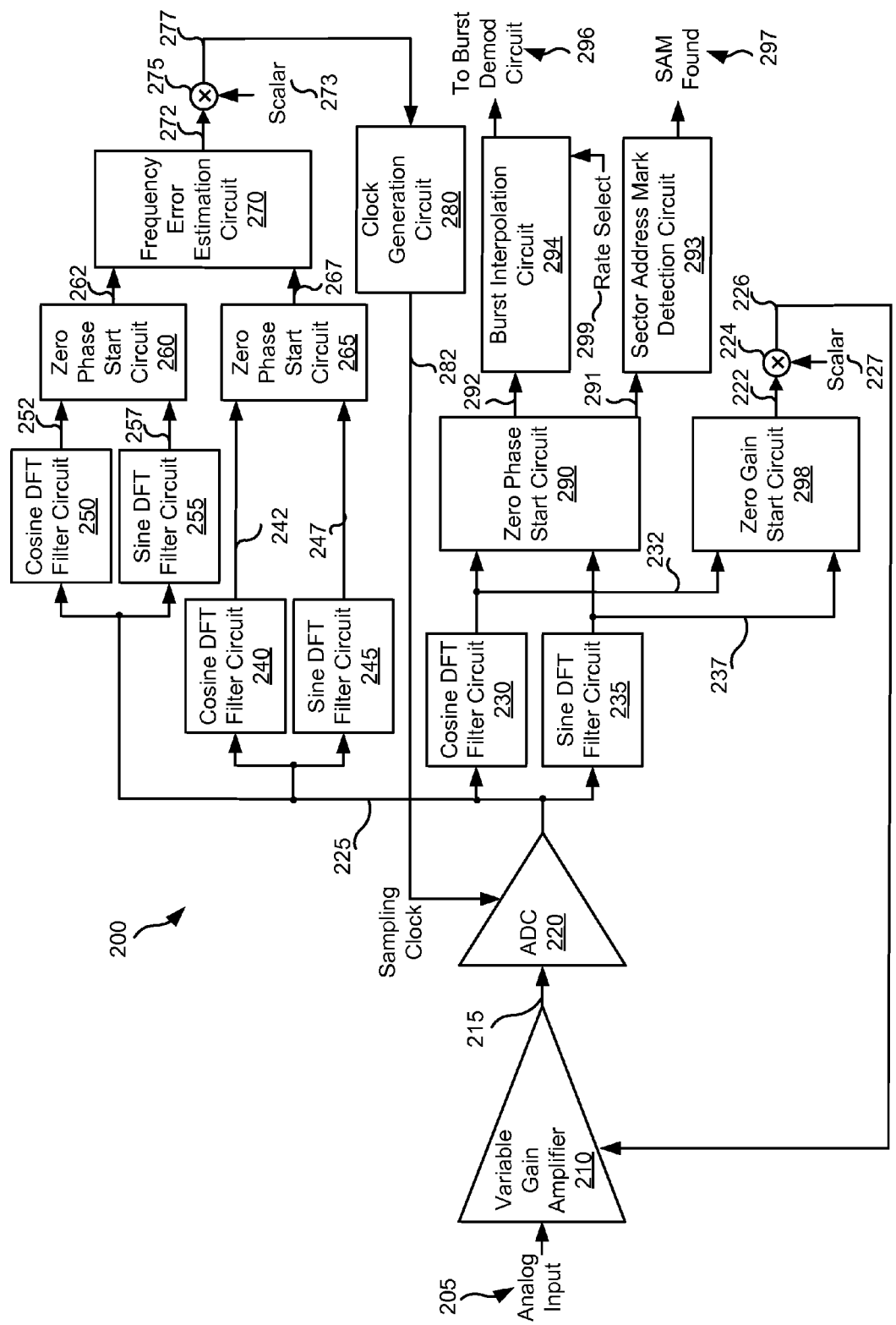
FIG. 2 depicts a data processing circuit including reduced complexity timing recovery circuitry in accordance with various embodiments of the present invention.

Turning to FIG. 2 depicts a data processing circuit 200 including reduced complexity timing recovery circuitry in accordance with various embodiments of the present invention. The reduced complexity timing recovery circuitry include zero phase start and zero gain start circuitry used to estimate phase, frequency and gain errors without reliance on standard phase lock or automatic gain control circuitry. In some cases, such circuits are able to perform data detection and/or data processing on an asynchronous data input with less format overhead than that typically utilized in a more traditional circuit. In one or more cases, such circuits offer reduced recovery latency (e.g., an increased rate of convergence that is substantially independent of preamble length) when compared with more traditional circuits and are less vulnerable to circuit non-idealities. In particular cases, the data processing and/or data detection processing is substantially insensitive to the length of a data pattern used for detection. In some cases, data detection processes (e.g., sector address mark detection) begins right after samples are transferred to the zero phase start and zero gain start circuitry, and the detection is performed in parallel with zero phase start and zero gain start computation.

Data processing circuit 200 includes a variable gain amplifier circuit 210 that amplifies a signal received as an analog input 205 by a gain controlled by a variable gain feedback value 226. Variable gain amplifier circuit 210 may be any circuit known in the art that is capable of applying a variable gain to a received input. Variable gain amplifier circuit 210 provides the amplified signal as an amplified output 215. Amplified output 215 is provided to an analog to digital converter circuit 220 where it is sampled at a phase and frequency controlled by a sampling clock 282 to yield a series of digital samples 225.

Digital samples 225 are provided to a cosine discrete Fourier transform filter circuit 230 and a sine discrete Fourier transform filter circuit 235. Cosine discrete Fourier transform filter circuit 230 performs a discrete Fourier transform over digital samples 225 that correspond to a repeating pattern (e.g., a preamble pattern) in the signal received via analog input 205 to yield a cosine component output 232. Similarly, sine discrete Fourier transform filter circuit 235 performs a discrete Fourier transform over digital samples 225 that correspond to a repeating pattern in the signal received via analog input 205 to yield a sine component output 237.

A zero gain start circuit 298 receives both sine component output 237 and cosine component output 232, and based thereon calculates a raw gain error value 222. In particular, zero gain start circuit 298 calculates raw gain error value 222 by estimating the amplitude of the repeating pattern in accordance with the following equation:

$$\text{Amplitude} = \sqrt{(\text{sine component output 237})^2 + (\text{cosine component output 232})^2}.$$

The aforementioned estimated amplitude is then compared with a programmed target (not shown) to yield raw gain error value 222. To mitigate noise impact, an averaged gain loop can be implemented by applying an update gain, defined a scalar 227, to raw gain error value 222 before updating the gain to variable gain amplifier circuit 210.

Raw gain error value 222 is provided to a selective multiplier circuit 224 that selectively scales raw gain error value 222 by a scalar 227 when the magnitude of raw gain error value 222 exceeds a programmable threshold value (not shown). The output of selective multiplier circuit 224 is provided as a gain output 226 to variable gain amplifier circuit 210. Gain output 226 governs the amount of gain applied by variable gain amplifier circuit 210 to the signal received via analog input 205. The operation of selective multiplier circuit 224 is described in the following pseudocode:

```
If (raw gain error value 222 < Threshold)
{
    gain output 226 = (raw gain error value 222)/(scalar 227)
}
Else
{
    gain output 226 = raw gain error value 222
}
```

A zero phase start circuit 290 receives cosine component output 232 and sine component output 237. Based on these components, the best phase is selected. The best phase selection is a two part process: selecting a quadrant and selecting a fine phase. The quadrant is estimated based on the sign of cosine component output 232 and sine component output 237, and the fine phase is derived from the following zero phase calculation:

$$\text{Phase} = a\tan\left(\frac{\text{cosine component 232}}{\text{sine component 237}}\right).$$

Zero phase start circuit 290 provides the quadrant and fine phase information as a phase select output 291 to sector address mark detection circuit 293. Sector address mark detection circuit 293 processes the received data to identify a sector address mark, and upon identifying a sector address mark a SAM found output 297 is asserted. While sector address mark detection circuit 293 is tailored for detecting a sector address mark, it may more generally be referred to as a "location detection circuit" that may be operable to detect any mark or pattern. Based upon the disclosure provided herein, one of ordinary skill in the art will recognize a variety of location detection circuits that may be used in relation to different embodiments of the present invention.

Additionally, an output 292 from zero phase start circuit 290 is provided to a burst interpolation circuit 294 where it is used along with a rate selector input 299 to select inputs for a four tap interpolation filter implemented as part of burst interpolation circuit 294. To correct the phase for burst demodulation, a digital interpolator can be used to snap the phase instantaneously. The digital filter may be, but is not limited to, a 4-tap finite impulse response filter, and its coefficients are generated based on sinc function, and optimized for each burst rate. The coefficients can be implemented in a lookup table (selected based on the rate select (e.g., quarter rate, half rate, full rate) and output 292 (e.g., −32 to +32)), where the index to the table is the burst rate and the phase error estimated by the aforementioned zero phase start calculation. The following table lists example coefficients for full rate, half rate and quarter rate bursts respectively, where the phase resolution is T/64.

| Phase Error xT/64 | Full Rate Burst | Half Rate Burst | Quarter Rate Burst |
|---|---|---|---|
| −32 | 0 0 362 −362 | −107 321 321 −107 | −121 364 364 −121 |
| −31 | 0 0 371 −353 | −106 311 331 −108 | −120 352 375 −122 |
| −30 | 0 0 379 −344 | −104 301 341 −109 | −118 341 386 −123 |
| −29 | 0 0 388 −334 | −103 291 351 −109 | −116 329 397 −124 |
| −28 | 0 0 396 −325 | −101 280 361 −110 | −114 317 407 −124 |
| −27 | 0 0 404 −315 | −99 270 370 −110 | −111 304 417 −124 |
| −26 | 0 0 411 −305 | −97 259 379 −109 | −109 292 427 −123 |
| −25 | 0 0 419 −295 | −94 249 388 −109 | −106 279 436 −122 |
| −24 | 0 0 426 −284 | −92 238 397 −108 | −103 267 444 −121 |
| −23 | 0 0 433 −274 | −89 227 405 −107 | −99 254 453 −120 |
| −22 | 0 0 439 −263 | −86 217 414 −106 | −96 241 461 −118 |
| −21 | 0 0 445 −252 | −83 206 422 −104 | −92 229 468 −116 |
| −20 | 0 0 452 −241 | −80 195 429 −102 | −88 216 475 −113 |
| −19 | 0 0 457 −230 | −76 184 437 −100 | −84 203 482 −110 |
| −18 | 0 0 463 −219 | −73 174 444 −97 | −80 191 488 −107 |
| −17 | 0 0 468 −207 | −69 163 451 −95 | −76 178 493 −104 |
| −16 | 0 0 473 −196 | −65 153 458 −92 | −71 166 498 −100 |
| −15 | 0 0 478 −184 | −62 142 464 −88 | −67 154 503 −95 |
| −14 | 0 0 482 −172 | −58 132 470 −84 | −62 142 507 −91 |
| −13 | 0 0 486 −161 | −54 121 475 −80 | −58 130 510 −86 |
| −12 | 0 0 490 −149 | −50 111 481 −76 | −53 119 514 −81 |

-continued

| Phase Error xT/64 | Full Rate Burst | Half Rate Burst | Quarter Rate Burst |
|---|---|---|---|
| −11 | 0 0 493 −137 | −46 101 485 −71 | −49 107 516 −76 |
| −10 | 0 0 497 −124 | −42 91 490 −66 | −44 96 518 −70 |
| −9 | 0 0 500 −112 | −37 81 494 −61 | −39 85 520 −64 |
| −8 | 0 0 502 −100 | −33 71 498 −55 | −35 74 521 −58 |
| −7 | 0 0 504 −88 | −29 62 501 −49 | −30 64 521 −51 |
| −6 | 0 0 506 −75 | −25 52 504 −43 | −26 54 521 −45 |
| −5 | 0 0 508 −63 | −21 43 506 −37 | −21 44 521 −38 |
| −4 | 0 0 510 −50 | −16 34 508 −30 | −17 35 520 −31 |
| −3 | 0 0 511 −38 | −12 25 510 −23 | −12 26 519 −23 |
| −2 | 0 0 511 −25 | −8 16 511 −15 | −8 17 517 −16 |
| −1 | 0 0 512 −13 | −4 8 512 −8 | −4 8 515 −8 |
| 0 | 0 0 512 0 | 0 0 512 0 | 0 0 512 0 |
| 1 | 0 512 13 0 | −8 512 8 −4 | −8 515 8 −4 |
| 2 | 0 511 25 0 | −15 511 16 −8 | −16 517 17 −8 |
| 3 | 0 511 38 0 | −23 510 25 −12 | −23 519 26 −12 |
| 4 | 0 510 50 0 | −30 508 34 −16 | −31 520 35 −17 |
| 5 | 0 508 63 0 | −37 506 43 −21 | −38 521 44 −21 |
| 6 | 0 506 75 0 | −43 504 52 −25 | −45 521 54 −26 |
| 7 | 0 504 88 0 | −49 501 62 −29 | −51 521 64 −30 |
| 8 | 0 502 100 0 | −55 498 71 −33 | −58 521 74 −35 |
| 9 | 0 500 112 0 | −61 494 81 −37 | −64 520 85 −39 |
| 10 | 0 497 124 0 | −66 490 91 −42 | −70 518 96 −44 |
| 11 | 0 493 137 0 | −71 485 101 −46 | −76 516 107 −49 |
| 12 | 0 490 149 0 | −76 481 111 −50 | −81 514 119 −53 |
| 13 | 0 486 161 0 | −80 475 121 −54 | −86 510 130 −58 |
| 14 | 0 482 172 0 | −84 470 132 −58 | −91 507 142 −62 |
| 15 | 0 478 184 0 | −88 464 142 −62 | −95 503 154 −67 |
| 16 | 0 473 196 0 | −92 458 153 −65 | −100 498 166 −71 |
| 17 | 0 468 207 0 | −95 451 163 −69 | −104 493 178 −76 |
| 18 | 0 463 219 0 | −97 444 174 −73 | −107 488 191 −80 |
| 19 | 0 457 230 0 | −100 437 184 −76 | −110 482 203 −84 |
| 20 | 0 452 241 0 | −102 429 195 −80 | −113 475 216 −88 |
| 21 | 0 445 252 0 | −104 422 206 −83 | −116 468 229 −92 |
| 22 | 0 439 263 0 | −106 414 217 −86 | −118 461 241 −96 |
| 23 | 0 433 274 0 | −107 405 227 −89 | −120 453 254 −99 |
| 24 | 0 426 284 0 | −108 397 238 −92 | −121 444 267 −103 |
| 25 | 0 419 295 0 | −109 388 249 −94 | −122 436 279 −106 |
| 26 | 0 411 305 0 | −109 379 259 −97 | −123 427 292 −109 |
| 27 | 0 404 315 0 | −110 370 270 −99 | −124 417 304 −111 |
| 28 | 0 396 325 0 | −110 361 280 −101 | −124 407 317 −114 |
| 29 | 0 388 334 0 | −109 351 291 −103 | −124 397 329 −116 |
| 30 | 0 379 344 0 | −109 341 301 −104 | −123 386 341 −118 |
| 31 | 0 371 353 0 | −108 331 311 −106 | −122 375 352 −120 |

Burst interpolation circuit 294 provides the output filtered using the selected taps as an output 296 to a burst demodulation circuit (not shown) where standard burst demodulation is performed.

Frequency error circuitry includes cosine discrete Fourier transform filter circuits 240, 250, sine discrete Fourier transform filter circuits 245, 255, zero phase start circuits 260, 265, and a frequency error estimation circuit 270. Frequency error estimation circuit 270 calculates a raw frequency error value 272 using two consecutive zero phase start values from the respective zero phase start circuits 260, 265.

In particular, each of cosine discrete Fourier transform filter circuits 240, 250 and sine discrete Fourier transform filter circuits 245, 255 receive digital samples 225. Cosine discrete Fourier transform filter circuit 240 calculates a first cosine value for digital samples corresponding to a first window to yield a first cosine output 242, and sine discrete Fourier transform filter circuit 245 calculates a first sine value for digital samples corresponding to the second window to yield a first sine output 247. Similarly, cosine discrete Fourier transform filter circuit 250 calculates a first cosine value for digital samples corresponding to a second window to yield a second cosine output 252, and sine discrete Fourier transform filter circuit 255 calculates a second sine value for digital samples corresponding to the second window to yield a second sine output 257. In some cases, the first window corresponds to the first half of the received digital samples 225, and the second window corresponds to the second half of the received digital samples.

A phase estimation corresponding to the first window is calculated by zero phase circuit 265 in accordance with the following equation:

$$\theta_1 = a\tan\left(\frac{\text{first cosine output 242}}{\text{first sine output 247}}\right).$$

The aforementioned phase estimate is provided s phase output 267. Similarly, a phase estimation corresponding to the second window is calculated by zero phase circuit 260 in accordance with the following equation:

$$\theta_2 = a\tan\left(\frac{\text{second cosine output 252}}{\text{second sine output 257}}\right).$$

The aforementioned phase estimate is provided as phase output 262. Phase output 262 and phase output 267 are provided to a frequency error estimation circuit 270 that calculates a frequency error and provides the calculated error as raw frequency error value 272 in accordance with the following equation:

$$\text{error} = \frac{(\theta_2 - \theta_1) * (\text{Sampling Period})/360}{\text{Sample Length}/2},$$

where the Sample Length is the total number of samples used to calculate phase output 262 and phase output 267 (i.e., the number of samples in the first window and the second window), and the sampling period may be, for example, 4T (i.e., four times the sampling frequency).

Raw frequency error value 272 is provided to a selective multiplier circuit 275 that selectively scales raw frequency error value 272 by a scalar 273 when the magnitude of raw frequency error value 272 exceeds a programmable threshold value (not shown). The output of selective multiplier circuit 275 is provided as a frequency offset output 277 to a clock generation circuit 280. The operation of selective multiplier circuit 275 is described in the following pseudocode:

```
If (raw frequency error value 275 < Threshold)
{
    frequency offset output 277 = (raw frequency error value 272)/
    (scalar 273)
}
Else
{
    frequency offset output 277 = raw frequency error value 272
}
```

Clock generation circuit 280 modifies sampling clock 282 based on frequency offset output 277 and a reference clock input (not shown). Clock generation circuit 280 may be any phase/frequency correction circuit known in the art that is capable of adjusting a sampling clock based on an offset value.

It should be noted that cosine discrete Fourier transform filter circuits 230, 240, 250 may be implemented as a single cosine discrete Fourier transform filter circuit. Sine discrete Fourier transform filter circuits 235, 245, 255 may be implemented as a single sine discrete Fourier transform filter circuit. Further, zero phase start circuits 260, 265 may be implemented as a single zero phase start circuit. In addition, the aforementioned zero phase start circuitry may provide the zero phase start calculation value used by combination best phase selection and zero phase start circuit 290.

Figure 3:
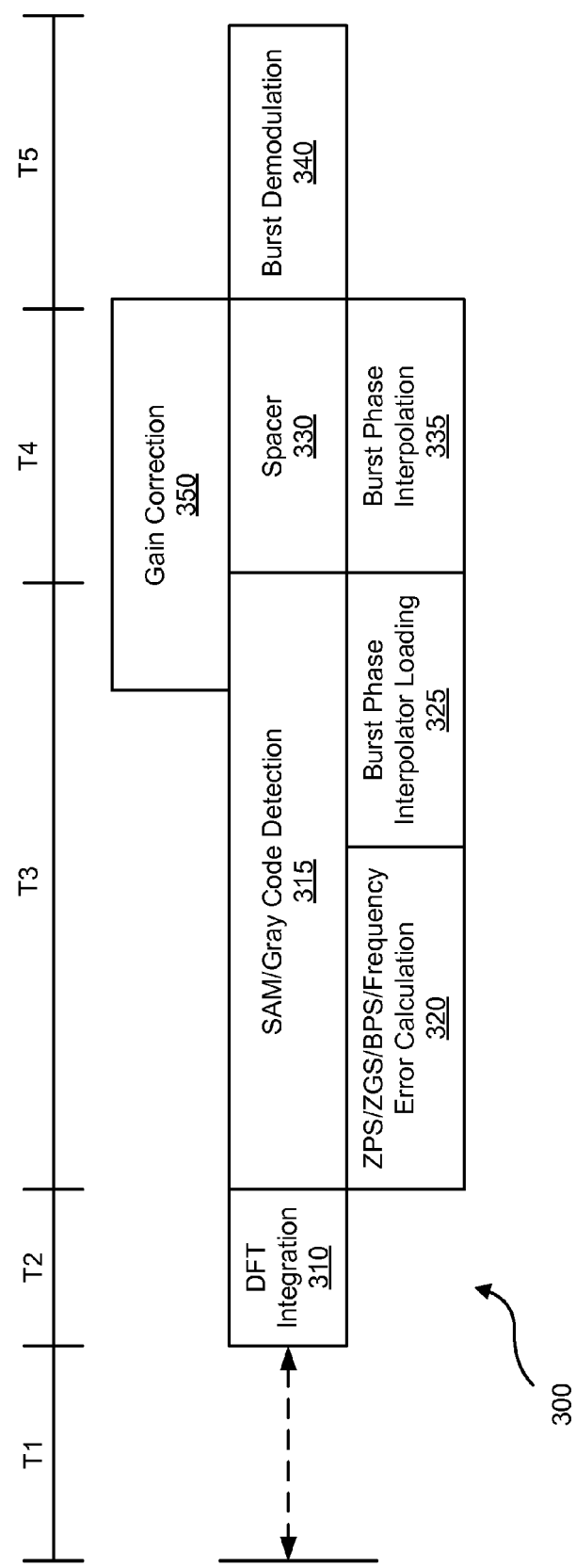

Turning to FIG. 3, a timing diagram 300 shows an example operation of data processing circuit 200. As shown, a time period T1 is time reserved for analog settling and startup latency. Time period T1 allows time for various analog front end circuitry (i.e., upstream circuitry responsible for providing the signal via analog input 205) to settle to servo settings. In some cases, variable gain feedback value 226 is loaded into variable gain amplifier circuit 210 during time period T1.

A time period T2 is the time to perform the discrete Fourier transform calculations (i.e., the calculations done by cosine discrete Fourier transform filter circuits 230, 240, 250, and sine discrete Fourier transform filter circuits 235, 245, 255. (block 310). During a time period T3, zero phase start calculation, zero gain start calculation, best phase selection and frequency error calculation are performed. (block 320). As the pattern detection (e.g., sector address mark detection and/or Gray code detection) is not necessarily reliant on refined synchronization, it may be performed in parallel during time period T3. (block 315). In some cases, it is desirable to perform zero phase start calculation prior to performing some portions of the data detection processes (e.g., sector address mark detection). In such cases, zero phase start calculation is done as soon as reasonably possible. As one advantage, no additional preamble needs to be spent on waiting for best phase selection since the interpolator output used for data detection processing (e.g., sector address mark detection and/or Gray code detection) has a latency comparable to that of the zero phase start calculation, samples used for the zero phase start calculation, and even this latency is not enough for the best phase selection, the interpolator output can always be pipelined to wait for the result of the best phase selection to become available.

Since no phase or gain correction is made during preamble in this mode, the data detection processing can start right on the digital sample directly subsequent to the end of time period T2. If desired, the coefficients of the phase interpolation filter on the burst demodulation path may be loaded according to burst rate setting once the zero phase start calculation result is available. (block 325). In some cases, this loading is completed before the last bit of the preceding data detection data (i.e., the last bit of the Gray code) from the analog to digital converter circuit. By using zero phase start data that does not rely on loop feedback to be established to select filter taps for loading into the burst interpolation filter and operation of the burst interpolation filter require a relatively short sequence to operate, the time required to complete burst phase interpolation (block 335), and thus the length of spacer period (block 330) may be reduced when compared with conventional approaches.

As sector address mark detection and Gray code detection is not particularly sensitive to gain, gain correction (block 350) may begin as soon as relevant inputs become available prior to the completion of the sector address detection and/or Gray code detection.

If the burst format is sensitive to phase or gain error, these errors can be compensated before burst demodulation starts. To save format, the propagation delay of the analog front end circuit can be pre-compensated by loading the circuit earlier. For example, if a continuous time filter (not shown) and analog to digital converter circuit 220 may have a 4T (where T is the sampling period) propagation delay respectively, the update to variable gain amplifier circuit 210 may be applied 8T before the last sample corresponding to the pattern detection (e.g., Gray code detection). The timing of gain correction and burst demodulation are also shown relative to the aforementioned time periods. (blocks 340, 350).

Figure 4:
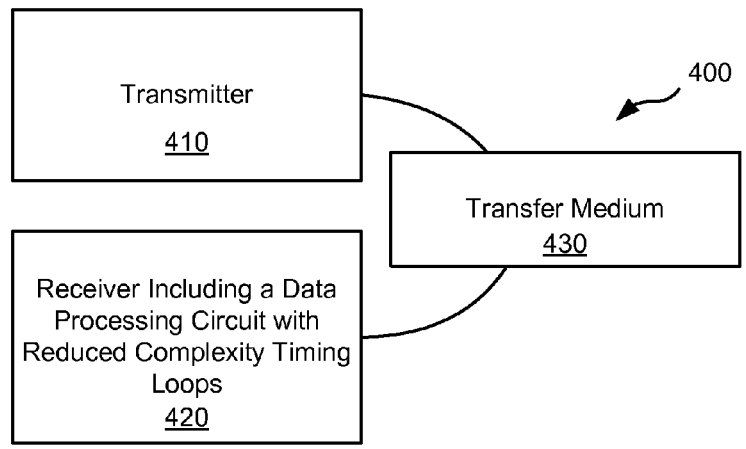
FIG. 4 shows a transmission system having a data processing circuit with reduced complexity timing loops in accordance with one or more embodiments of the present invention.

Turning to FIG. 4, a transmission system 400 including a data processing circuit with reduced complexity timing loops in accordance with one or more embodiments of the present invention. Transmission system 400 includes a transmitter 410 that is operable to transmit encoded information via a transfer medium 430 as is known in the art. The encoded data is received from transfer medium 430 by receiver 420. Receiver 420 incorporates a data detection and synchronization process using a data processing circuit with reduced complexity timing loops. Such a data processing circuit may include circuitry similar to that discussed above in relation to FIG. 2, and/or may operate consistent with the method discussed below in relation to FIG. 6.

Figure 5:
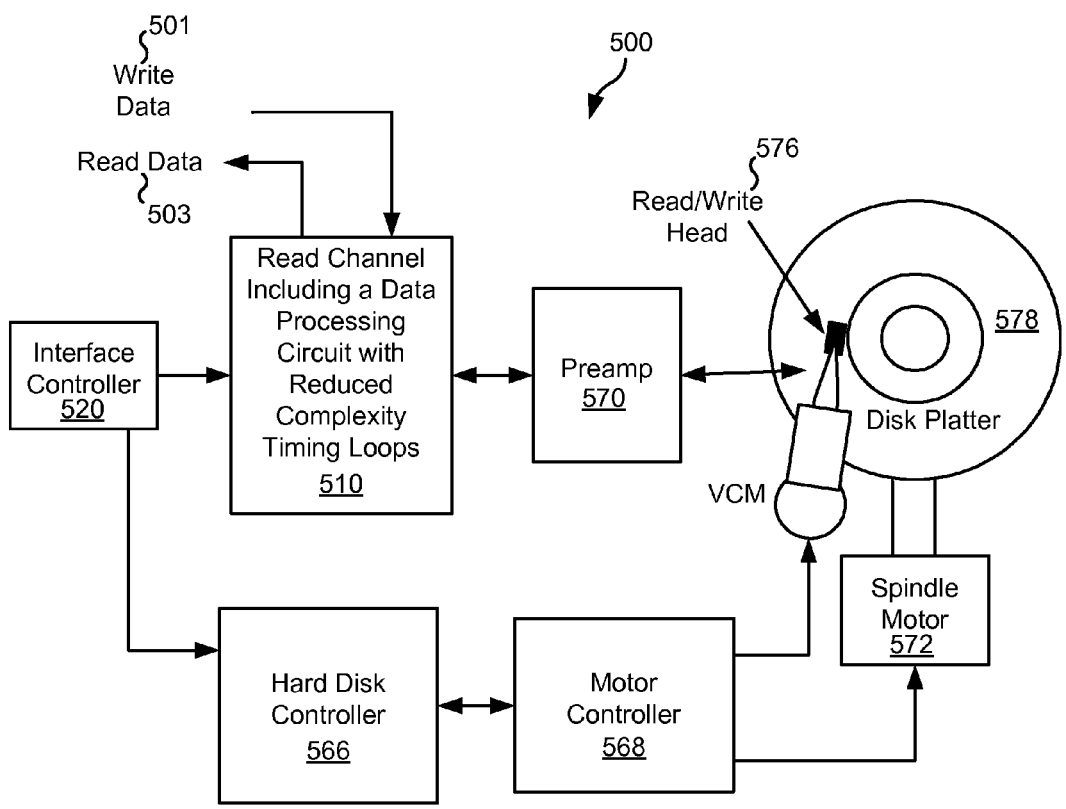
FIG. 5 depicts a storage device including a data processing circuit with reduced complexity timing recovery circuitry in accordance with some embodiments of the present invention.

Turning to FIG. 5, a storage system 500 including a read channel circuit 510 with a phase shift based polarity detection circuit is shown in accordance with some embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. As part of decoding the received information, read channel circuit 510 performs a data detection and synchronization process using a data processing circuit with reduced complexity timing loops. Such a data processing circuit may include circuitry similar to that discussed above in relation to FIG. 2, and/or may operate consistent with the method discussed below in relation to FIG. 6. A write operation is substantially the opposite of the preceding read operation with write data 501 being provided to read channel circuit 510. This data is then encoded and written to disk platter 578.

It should be noted that storage system 500 may be integrated into a larger storage system such as, for example, a RAID (redundant array of inexpensive disks or redundant array of independent disks) based storage system. It should also be noted that various functions or blocks of storage system 500 may be implemented in either software or firmware, while other functions or blocks are implemented in hardware.

Figure 6:
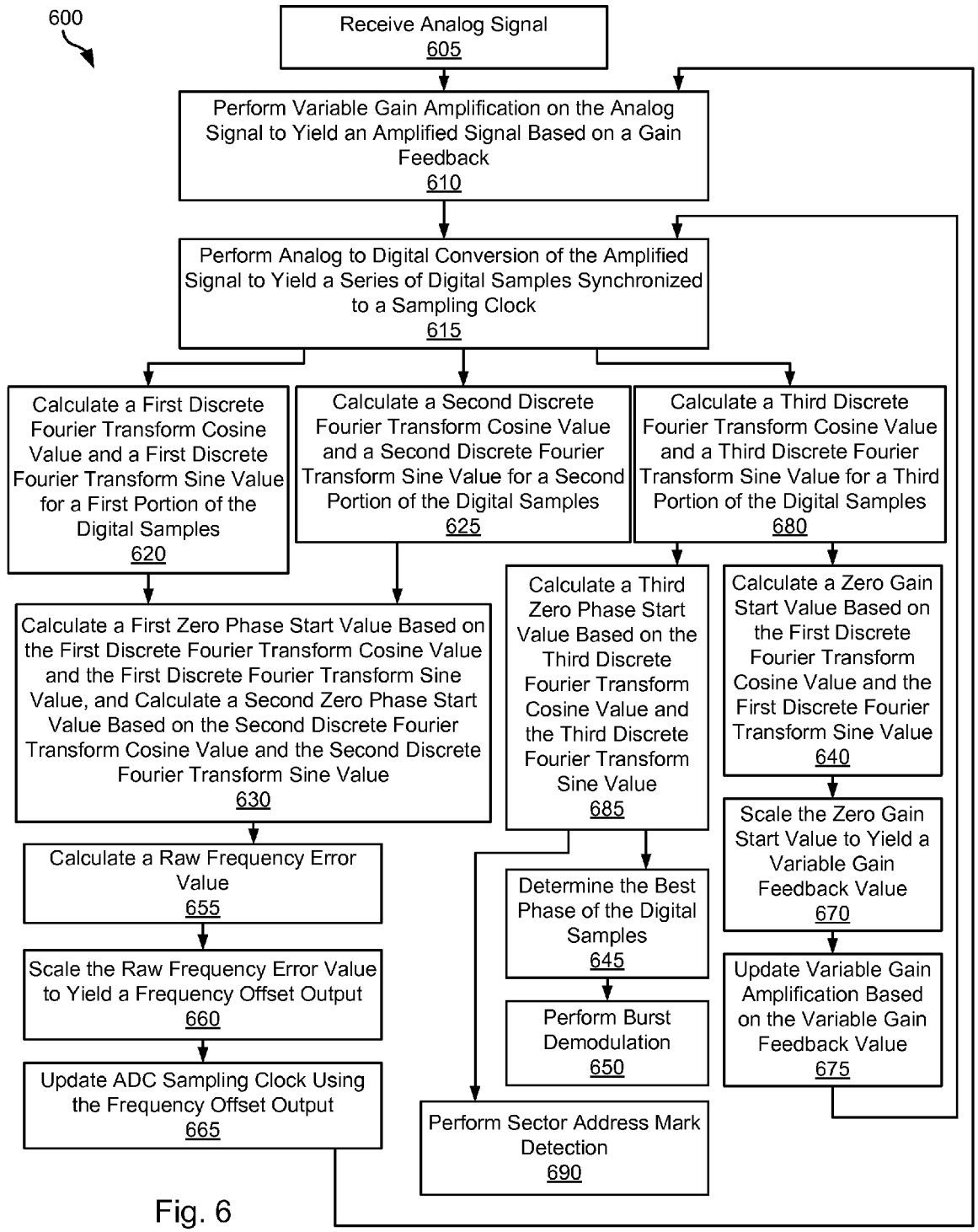
FIG. 6 is a flow diagram showing a method for data processing using reduced complexity timing in accordance with some embodiments of the present invention.

Turning to FIG. 6, a flow diagram 600 showing a method for data processing using reduced complexity timing is shown in accordance with some embodiments of the present invention. Following flow diagram 600, an analog signal is received (block 605). This analog signal may be derived, for example, by sensing information stored on a storage medium or receiving information via a wireless transmission device. Based upon the disclosure provided herein, one of ordinary skill in the art will recognize a variety of sources of the analog signal. A variable gain amplification is applied to the analog signal to yield an amplified signal (block 610). The gain applied in the amplification is based upon a gain feedback. Any approach known in the art for variable gain amplification may be used.

The amplified output is provided to an analog to digital converter circuit where it is converter to a series of digital samples (block 615). The digital samples correspond to the amplified output at a phase and frequency governed by a sampling clock. Any analog to digital conversion process known in the art may be used.

A discrete Fourier transform is applied to a first portion of the digital samples (i.e., a number of digital samples corresponding to a periodic pattern in the analog input over a first time period or window) to yield a first discrete Fourier transform cosine value and a first discrete Fourier transform sine value (block 620). In addition, a discrete Fourier transform is applied to a second portion of the digital samples (i.e., a number of digital samples corresponding to the periodic pattern in the analog input over a second time period or window) to yield a second discrete Fourier transform cosine value and a second discrete Fourier transform sine value (block 620). Further, a discrete Fourier transform is applied to a third portion of the digital samples (i.e., a number of digital samples corresponding to the periodic pattern in the analog input over a third time period or window) to yield a third discrete Fourier transform cosine value and a third discrete Fourier transform sine value (block 680). In one particular embodiment of the present invention where a given number of samples are processed, the first portion of the digital samples is a first half of the digital samples, the second portion of the digital samples is the subsequent half of the digital samples, and the third portion of the digital samples includes both the first half and subsequent half of the digital samples. Based upon the disclosure provided herein, one of ordinary skill in the art will recognize various subsets of the digital samples that may be used for the first portion, the second portion, and the third portion of the digital samples.

A first zero phase start value is calculated using the first discrete Fourier transform cosine value (first DFT cosine) and the first discrete Fourier transform sine value (first DFT sine), and a second zero phase start value is calculated using the second discrete Fourier transform cosine value (second DFT cosine) and the second discrete Fourier transform sine value (second DFT sine) (block 630). The first zero phase start value is calculated in accordance with the following equation:

$$\text{First ZeroPhase Start Value} = a\tan\left(\frac{\text{first DFT cosine}}{\text{first DFT sine}}\right).$$

The second zero phase start value is calculated in accordance with the following equation:

$$\text{Second ZeroPhase Start Value} = a\tan\left(\frac{\text{Second DFT cosine}}{\text{Second DFT sine}}\right).$$

The first zero phase start value and the second zero phase start value are used to calculate a raw frequency error value (block 655). Calculating the raw frequency error value includes using the first zero phase start value as a first phase estimate ($\theta_1$) for the first portion of the digital samples, and using the second zero phase start value as a second phase estimate ($\theta_2$) for the second portion of the digital samples. These two phase estimates are combined to calculate the raw frequency error value in accordance with the following equation:

$$\text{raw frequency error} = \frac{(\theta_2 - \theta_1) * (\text{Sampling Period})/360}{\text{Sample Length}/2},$$

where the Sample Length is the total number of samples used to calculate the first DFT cosine and the first DFT sine and the second DFT cosine and the second DFT sine, and the sampling period may be, for example, 4T (i.e., four times the sampling frequency).

The raw frequency error value is scaled to yield a frequency offset output (block 660). This scaling may be done, for example, to allow for a relatively quick and noisy correction when the raw frequency error value is greater than a threshold, and to allow for slower less noisy correction when the raw frequency error value is less than the threshold. The following pseudocode describes the scaling process:

```
If (raw frequency error value < Threshold)
{
    frequency offset output = (raw frequency error value)/(scalar)
}
Else
{
    frequency offset output = raw frequency error value
}
```

The phase/frequency of the sampling clock used by the analog to digital conversion process is updated to reflect the calculated frequency offset output (block 665). Updating the phase/frequency may be done using and clock generation or correction approach known in the art.

A third zero phase start value is calculated using the third discrete Fourier transform cosine value (first DFT cosine) and the third discrete Fourier transform sine value (first DFT sine) (block 685). The best phase is selected based upon the third zero phase start value (block 645). Selecting the best phase is done in two parts. The first part includes selecting the quadrant where the sign of both the first DFT sin and the first DFT cosine is positive, and the second part includes selecting the phase in the selected quadrant where the first zero phase start is a maximum. This selected best phase is provided to a burst demodulation circuit that uses the digital samples corresponding to the best phase to perform burst demodulation (block 650). Any process known in the art for performing burst demodulation processing may be used. In addition, sector address mark detection is performed based upon the series of digital samples and third zero phase start value (block 690). Where a sector address mark is found, a SAM found signal is asserted.

A zero gain start value is calculated based on the first DFT cosine and the first DFT sine (block 640). In particular, the zero gain calculation is done by calculating an amplitude in accordance with the following equation:

$$\text{Amplitude} = \sqrt{(\text{firstDFTsine})^2 + (\text{firstDFTcosine})^2}.$$

The aforementioned estimated amplitude is then compared with a programmed threshold amplitude (not shown) to yield a raw gain error value. The raw gain error value is scaled to yield a gain feedback value (block 670). This scaling may be done, for example, to allow for a relatively quick and noisy correction when the raw gain error value is greater than a threshold, and to allow for slower less noisy correction when the raw gain error value is less than the threshold. The following pseudocode describes the scaling process:

```
If (raw gain error value < Threshold)
{
    variable gain feedback = (raw gain error value)/(scalar)
}
Else
{
    variable gain feedback = raw gain error value
}
```

Ultimately, the variable gain feedback is applied to the variable gain amplifier to adjust the gain (block 675).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A data processing circuit, the data processing circuit comprising:
    an analog front end circuit operable to receive an analog signal and to provide a series of digital samples corresponding to the analog signal;
    a cosine component calculation circuit operable to calculate a cosine component from the series of digital samples;
    a sine component calculation circuit operable to calculate a sine component from the series of digital samples; and
    a zero phase start calculation circuit operable to provide a phase select output to a location detection circuit.

2. The data processing circuit of claim 1, wherein the analog front end circuit includes an analog to digital conversion circuit that is synchronized to a sampling clock, and wherein the circuit further comprises:
    a zero phase start circuit operable to calculate a first zero phase start value based upon a first portion of the series of digital samples, and to calculate a second zero phase start value based upon a second portion of the series of digital samples; and
    a frequency error estimation circuit, wherein the frequency error estimation circuit calculates a raw frequency error value based at least in part on the first zero phase start value and the second zero phase start value.

3. The data processing circuit of claim 2, wherein operation of the location detection circuit is done in parallel to operation of the frequency error estimation circuit.

4. The data processing circuit of claim 3, wherein the location detection circuit includes a sector address mark detection circuit.

5. The data processing circuit of claim 2, wherein the sampling clock is generated based at least in part an offset derived from the raw frequency error value.

6. The data processing circuit of claim 2, wherein the cosine component is a first cosine component corresponding to a first portion of the series of digital samples, wherein the sine component is a first sine component corresponding to the first portion of the series of digital samples, wherein the cosine component calculation circuit is further operable to calculate a second cosine component corresponding to a second portion of series of digital samples, wherein the sine component calculation circuit is further operable to calculate a second sine component corresponding to the second portion of series of digital samples, and wherein the first zero phase start value ($\theta_1$) is calculated in accordance with the following equation:

$$\theta_1 = a\tan\left(\frac{\text{first cosine component}}{\text{first sine component}}\right),$$

and
wherein the second zero phase start value ($\theta_2$) is calculated in accordance with the following equation:

$$\theta_2 = a\tan\left(\frac{\text{second cosine component}}{\text{second sine component}}\right).$$

7. The data processing circuit of claim 6, wherein the frequency error estimation circuit calculates the raw frequency error value in accordance with the following equation:

$$\text{raw frequency error value} = \frac{(\theta_2 - \theta_1) * (\text{Sampling Period})/360}{\text{Sample Length}/2},$$

wherein the Sample Length is the total number of samples used to calculate the first sine component and the second sine component, and wherein the Sampling Length is the period during which a repeating signal conveyed as the series of digital samples repeat.

8. The data processing circuit of claim 1, wherein the cosine calculation circuit is a first discrete Fourier transform circuit, and wherein the sine calculation circuit is a second discrete Fourier transform circuit.

9. The data processing circuit of claim 1, wherein the analog front end circuit includes a variable gain amplifier circuit operable to apply a gain to the analog signal data input corresponding to a gain feedback value and to provide an amplified output, and wherein the data processing circuit further comprises:
a zero gain start calculation circuit operable to calculate a raw gain error value based on the cosine component and the sine component, where the gain feedback value is derived from the raw gain error value.

10. The data processing circuit of claim 9, wherein applying the feedback value to the variable gain amplifier is done while the location detection circuit is operating.

11. The data processing circuit of claim 9, wherein the zero gain start calculation circuit calculates an amplitude as the square root of the sine component squared plus the cosine component squared.

12. The data processing circuit of claim 9, wherein the data processing circuit further comprises:
a selective scaling circuit operable to selectively scale the amplitude based at least in part on a magnitude of the amplitude to yield the gain feedback value.

13. The data processing circuit of claim 1, wherein the data processing circuit is implemented in an integrated circuit.

14. The data processing circuit of claim 1, wherein the data processing circuit is implemented as part of an electronic device selected from a group consisting of: a hard disk drive and a data transmission device.

15. A method for data processing, the method comprising:
receiving an analog signal, wherein the analog signal includes a repeating signal;
converting the analog signal to a series of digital samples synchronous to a sampling clock;
performing a discrete Fourier transform of a first portion of the series of digital samples to yield a first sine component and a first cosine component;
performing a discrete Fourier transform of a second portion of the series of digital samples to yield a second sine component and a second cosine component;
performing a discrete Fourier transform of a third portion of the series of digital samples to yield a third sine component and a third cosine component;
calculating a frequency error value based at least in part on the first sine component, the second sine component, the first cosine component and the second cosine component;
adjusting the sampling clock based at least in part on the frequency error value;
selecting a best phase based at least in part on the third sine component and the third cosine component; and
performing a pattern detection using the best phase, wherein the pattern detection is performed in parallel with adjusting the sampling clock.

16. The method of claim 15, wherein selecting the best phase is done by calculating a zero phase start value based on the third sine component and the third cosine component.

17. The method of claim 15, wherein calculating the frequency error value includes calculating a first zero start value based on the first sine component and the first cosine component, and calculating a second zero start value based on the second sine component and the second cosine component.

18. The method of claim 17, wherein calculating the first zero start value ($\theta_1$) is done in accordance with the following equation:

$$\theta_1 = a\tan\left(\frac{\text{first cosine component}}{\text{first sine component}}\right),$$

and
wherein calculating the second zero phase start value ($\theta_2$) is done in accordance with the following equation:

$$\theta_2 = a\tan\left(\frac{\text{second cosine component}}{\text{second sine component}}\right).$$

19. The method of claim 18, wherein calculating the frequency error value is calculated in accordance with the following equation:

$$\text{frequency error value} = \frac{(\theta_2 - \theta_1) * (\text{Sampling Period})/360}{\text{Sample Length}/2},$$

wherein the Sample Length is the total number of samples used to calculate the first sine component and the second sine component, and wherein the Sampling Length is the period during which a repeating signal is repeated.

20. The method of claim 15, wherein the analog signal is a first analog signal, and wherein the method further comprises:
receiving a second analog signal;
performing a variable gain amplification on the second analog signal to yield the first analog signal, wherein a magnitude of the variable gain corresponds to a gain feedback value; and
calculating a zero gain start value based on the third cosine component and the third sine component; and
modifying the gain feedback value based at least in part on the zero gain start value.

21. The method of claim 20, wherein modifying the gain feedback is done during the pattern detection performance.

22. The method of claim 20, wherein the zero gain start value is the square root of the first sine component squared plus the second cosine component squared.

23. A data storage device, the data storage device comprising:
a storage medium operable to maintain information;
a read head disposed in relation to the storage medium and operable to sense the information and to provide an analog signal corresponding to the information, wherein the information includes a repeating signal;
a read circuit comprising:
a variable gain amplifier circuit operable to apply a gain to a data input corresponding to a gain feedback value and providing an amplified output;
an analog to digital conversion circuit operable to convert the amplified output to a corresponding series of digital samples synchronous to a sampling clock;

a cosine component calculation circuit operable to calculate a cosine component from the series of digital samples;

a sine component calculation circuit operable to calculate a sine component from the series of digital samples;

a zero gain start calculation circuit operable to calculate a raw gain error value based on the cosine component and the sine component, where the gain feedback value is derived from the raw gain error value;

a first zero phase start circuit operable to calculate a first zero phase start value based upon a first portion of the series of digital samples, and to calculate a second zero phase start value based upon a second portion of the series of digital samples;

a frequency error estimation circuit, wherein the frequency error estimation circuit calculates a frequency error value based at least in part on the first zero phase start value and the second zero phase start value;

a clock generation circuit operable to generate the sampling clock base at least in part on the frequency error value;

a second zero phase start circuit operable to calculate a third zero phase start value based upon a third portion of the series of digital samples; and a location detection circuit operable to detect a defined pattern using a phase selected based upon the third zero phase start value, wherein the location detection circuit operates in parallel to the frequency error estimation circuit.

24. The storage device of claim 23, wherein the cosine calculation circuit is a first discrete Fourier transform circuit, and wherein the sine calculation circuit is a second discrete Fourier transform circuit.

25. The storage device of claim 23, wherein the first zero phase start circuit and the second zero phase start circuit are implemented as the same circuit.

* * * * *